May 19, 1931.  J. W. MARTIN, JR  1,805,493
REFRIGERATING APPARATUS AND METHOD
Filed May 26, 1928
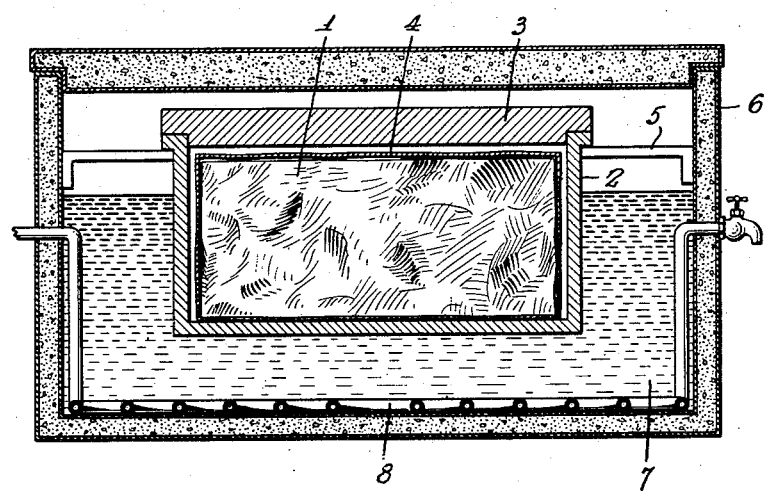
INVENTOR
James W. Martin Jr.
BY
ATTORNEY Patented May 19, 1931

1,805,493

UNITED STATES PATENT OFFICE

JAMES W. MARTIN, JR., OF YONKERS, NEW YORK, ASSIGNOR, BY MESNE ASSIGNMENTS, TO DRYICE EQUIPMENT CORPORATION, OF NEW YORK, N. Y., A CORPORATION OF DELAWARE

REFRIGERATING APPARATUS AND METHOD

Application filed May 26, 1928. Serial No. 280,740.

My present invention relates more particularly to methods of using frozen carbon dioxide as a refrigerating agent for cooling within a desired narrow range of temperature much higher than the temperature of melting or sublimation of frozen carbon dioxide. This is accomplished without the use of thermostat mechanisms or valve. The invention is shown herein as embodied in a simple dispensing apparatus adapted for use as a "water cooler" for drinking water, soda or the like, but its novel features are applicable to the cooling of other fluids for other purposes. Heretofore, the frozen carbon dioxide has proved impractical for ordinary water coolers and the like. Thermostatic mechanism commonly employed for temperature control are expensive, cumbersome and unreliable. On the other hand, proportioning and designing the water cooler itself for the proper cooling of the refrigerated liquid when the weather is hot or the demand great, is likely to result in over-refrigerating and freezing of said liquid when the water is cold or the demand is small.

According to my present invention, I secure an automatic control which is perfect for a limited time, but this may be made amply sufficient to take care of an initial charge of the frozen carbon dioxide sufficient to last out a working day or even longer. The apparatus employed is uncomplicated, fool proof and involves no expense for operation or upkeep.

The desired results are accomplished by interposing a body or layer of heat transmitting liquid between the frozen carbon dioxide and the conduit or container for the fluid that is to be cooled in heat transfer relation to both of them. Primarily the interposed liquid operates to absorb heat from the drinking water or other fluid, until itself cooled to its congealing point, which in the case of water is 32° F. Thereafter a layer of the interposed liquid will freeze upon a surface or surfaces of the frozen carbon dioxide container. This layer of liquid operates as added insulation for the frozen carbon dioxide and its exterior surface cannot be colder than the congealing point until all of said interposed liquid has been congealed and until this happens the effective refrigerating temperature will remain constant.

Therefore, for the desired controlling refrigeration of the drinking water or other fluid, it is necessary to make the surface of the container on which the ice forms big enough and thinly enough insulated so that ice will be formed on said surface during normal operation of the apparatus and the area of such ice should be sufficient to keep the unfrozen liquid which is still acting as the convection medium, at the desired low temperature for producing the desired refrigeration in the drinking water container or coil, which latter will of course be designed for a rate of heat absorption adequate for cooling the drinking water. In this situation, the drinking water cannot fall below the temperature of the interposed cooling liquid until the layer of ice on the frozen carbon dioxide container has become thick enough to reach it. Consequently, any practically desirable period of refrigeration may be taken care of by providing sufficient thickness of water between the refrigerating and the refrigerated surfaces.

In the ordinary case, the interposed convection liquid will be water and the solid insulating layer formed therefrom will be ordinary water ice, but it is evident that liquids of higher freezing points, as for instance, 35° F. or 40° F. may be employed if desired. Where the liquid to be cooled has a lower freezing point than water, the interposed controlling liquid may have a correspondingly lower freezing point.

The above and other features of my invention may be more fully understood from the following description in connection with the accompanying drawings, in which The figure is a vertical longitudinal section through a simple form of cooler adapted for drinking water, soda or the like.

The frozen carbon dioxide, 1, is enclosed in a water-tight container 2 having a cover 3, of wood, metal or other material, affording such heat insulation as may be required. The frozen carbon dioxide has its sublimating rate further controlled by an intermediate wrapper or box 4, which may be of paper or of metal according as a slower or more rapid rate is desired. The container 2 is supported, as by cross bars 5 in a container 6 of substantially larger size and the interspace filled with the heat transferring and insulating liquid 7 which may be water. A coil 8 or other container for drinking water or other liquid which is to be refrigerated is located in the outer container 6, in heat transfer relation to the regulating liquid, but spaced apart a suitable distance from the container for the frozen carbon dioxide, preferably below the latter.

The heat transfer from the coil 8 to water 7 and from the latter to container 2, sets up convection currents in the refrigerating water. The action is first to cool all of the water or other regulating liquid 7, nearly to its freezing point, in which condition it will be amply sufficient for cooling the liquid in the coil. The further action is to freeze a skin or shell of the regulating liquid on the container for the frozen carbon dioxide, such shell serving as effective insulation slowing down the rate of melting of the frozen carbon dioxide. The exterior surface of this skin or shell cools the regulating liquid or water which in its turn cools the water in the coils as before stated.

In order to make the above combination automatically operative for a given period, it is only necessary to predetermine the distance, that is, the amount of water between the surface of the frozen carbon dioxide container and the surface of the coil so that there will be sufficient intervening water to freeze and absorb, as latent heat, all of the cold that can be developed by the frozen carbon dioxide, in excess of that absorbed by the coil 8. The surface of container 2 thus exposed to the water 7 and the quantity of the frozen carbon dioxide will be regulated to some extent in accordance with the demand, that is, the rate of withdrawal of the liquid that is being refrigerated during a given period.

Distilled water 7 for the transfer medium will give a slightly higher freezing point than that of the refrigerated liquid, in coil 8, particularly when the latter is soda water. A gelatine solution may be employed for the transfer medium, the same being regulated to have a congealing point substantially above 32° F. The jellying of this solution by cold will prevent convection transfer of heat and the jelly will serve as an insulator.

Lower temperatures for other purposes may be accurately controlled by using solutions of various salts.

I claim:—

1. The method of automatically controlling the refrigerating effect of solidified carbon dioxide for a range of temperatures above the freezing point of freezable products to be refrigerated thereby, which method includes enclosing the solidified carbon dioxide in an insulating container in heat exchange relation with the upper portions only of a body of liquid having a desired freezing point not lower than the freezing point of the material to be refrigerated and which automatically reverses its thermo convection circulation so that the warmer liquid flows downward at a temperature substantially above the freezing point of said liquid, thereby freezing a layer of ice variably insulating the solidified carbon dioxide to compensate for variations in temperature of the unfrozen part of the liquid; and utilizing the low level portion of said body of liquid as a heat transfer medium for refrigerating the freezable product.

2. The method of automatically controlling the refrigerating effect of solidified carbon dioxide for a range of temperatures above the freezing point of freezable products to be refrigerated thereby, which method includes enclosing the solidified carbon dioxide in an insulating container in heat exchange relation with the upper portions only of a body of water of freezing point not substantially lower than the freezing point of the product to be refrigerated, with only a high level portion of said body of water in contact relation with said solidified carbon dioxide container; thereby cooling a high level portion of said body of water by heat exchange with the solidified carbon dioxide, and establishing downflow convection currents of the warmer part of the water; and utilizing only a low level portion of said water in heat exchange relation with the product to be refrigerated.

3. The method of utilizing solidified carbon dioxide to maintain approximately constant refrigerating effect on a water conduit to be refrigerated thereby, which method includes enclosing the solidified carbon dioxide in an insulating container in heat exchange relation with the upper portions only of a body of liquid having a desired freezing point not lower than the freezing point of the water to be cooled with only a high level portion of said body of water in contact relation with said solidified carbon dioxide container; thereby first cooling a high level portion of said body of water by heat exchange with the solidified carbon dioxide, and establishing downflow convection currents of the warmer part of the water; and thereafter freezing a layer of ice variably insulating the solidified carbon dioxide to compensate for variations in the unfrozen part of said body of water; and utilizing only a low level portion of said body of water in heat exchange relation with the material to be refrigerated.

4. Refrigerating apparatus including a heat insulating outer container, an inner container comprising a conduit for a liquid to be cooled having its heat absorbing area large and disposed at a low level in said outer container, a body of liquid of freezing point not lower than that of the liquid to be cooled, said liquid having the characteristic that its thermo convection circulation reverses at a temperature substantially above its freezing point, said liquid being filled in said outer container to a level far above the level of said heat absorbing portion of said inner container, and a container for solidified carbon dioxide in heat exchange relation with a high level portion only, of said body of liquid.

5. Refrigerating apparatus including a heat insulating outer container, an inner container comprising a conduit having exterior connections for supply and discharge of liquid to be cooled, the intermediate portion of said conduit being bent to a large area heat absorbing portion adjacent the bottom of said outer container, a body of liquid of freezing point not lower than that of the liquid to be cooled, said liquid having the characteristic that its thermo convection circulation reverses at a temperature substantially above its freezing point, said liquid being filled in said outer container to a level far above the level of said heat absorbing portion of said conduit, and a container for solidified carbon dioxide in heat exchange relation with a high level portion only, of said body of liquid.

6. Refrigerating apparatus including a heat insulating outer container, an inner container for a freezable product to be refrigerated having its heat absorbing area large and disposed at a low level in said outer container, a body of liquid of freezing point not lower than that of the freezable product to be cooled, said liquid having the characteristic that its thermo convection circulation reverses at a temperature substantially above its freezing point, said liquid being filled in said outer container to a level far above the level of said heat absorbing portion of said inner container and a container for solidified carbon dioxide in heat exchange relation with a high level portion only, of said body of liquid.

Signed at New York in the county of New York, and State of New York, this 25th day of May, A. D. 1928.

JAMES W. MARTIN, Jr.